United States Patent
Dasari et al.

(10) Patent No.: US 7,496,789 B2
(45) Date of Patent: Feb. 24, 2009

(54) HANDLING RESTART ATTEMPTS FOR HIGH AVAILABILITY MANAGED RESOURCES

(75) Inventors: Rajesh Dasari, Redwood City, CA (US); Juan Tellez, Piedmont, CA (US); Andrey Gusev, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 584 days.

(21) Appl. No.: 11/146,531

(22) Filed: Jun. 6, 2005

(65) Prior Publication Data

US 2006/0277429 A1    Dec. 7, 2006

(51) Int. Cl.
  *G06F 11/00*    (2006.01)
(52) U.S. Cl. .......................... 714/23; 714/37
(58) Field of Classification Search ............... 714/100, 714/4, 23, 37, 15
  See application file for complete search history.

(56) References Cited

U.S. PATENT DOCUMENTS

| | | | |
|---|---|---|---|
| 6,145,089 A * | 11/2000 | Le et al. ..................... | 714/4 |
| 6,370,572 B1 | 4/2002 | Lindskog et al. | |
| 6,854,069 B2 | 2/2005 | Kampe et al. | |
| 6,888,937 B1 | 5/2005 | Kurapati | |
| 7,243,267 B2 * | 7/2007 | Klemm et al. ............... | 714/38 |
| 7,251,727 B2 | 7/2007 | Adams et al. | |
| 7,251,755 B2 * | 7/2007 | Joshi et al. ................. | 714/43 |
| 2001/0042229 A1 * | 11/2001 | James ........................ | 714/48 |
| 2003/0236880 A1 * | 12/2003 | Srivastava et al. .......... | 709/224 |
| 2006/0230306 A1 * | 10/2006 | Richards et al. ............. | 714/7 |
| 2007/0162782 A1 * | 7/2007 | Eickhoff et al. ............. | 714/4 |

OTHER PUBLICATIONS

Hewlitt Packard, "Managing MC/ServiceGuard" HP manual, 10th Edition, Jun. 2003, retrieved from the internet at <http://docs.hp.com/en/ha.html>, pp. 1-427.
Hewlitt Packard, "Understanding MC/ServiceGuard Software: How Package Control Scripts Work,"Managing MC/ServiceGuard Manual, Chapter 3, Section 4 retrieved from the internet at <http://docs.hp.com/en/B3936-90073/ch03s04.html#d0e3181>, retrieved on Dec. 7, 2005, 7 pages.
Microsoft, "Server Clusters: Architecture Overview For Windows Server 2003," Microsoft Windows Server 2003 white paper, Mar. 2003, retrieved from the internet at <http://download.microsoft.com/download/0/a/4/0a4db63c-0488-46e3-8add-28a3c0648855/ServerClustersArchitecture.doc>, pp. i-iv (table of contents) and pp. 5-33.

(Continued)

*Primary Examiner*—Joshua A Lohn
(74) *Attorney, Agent, or Firm*—Hickman Palermo Truong & Becker LLP

(57) ABSTRACT

Techniques are provided for managing a resource in a High Availability (HA) system. The techniques involve incrementing a count when a particular type of remedial action is performed on a resource, so that the count that reflects how often the particular type of remedial action has been performed for the resource. When it is determined that the resource has been in stable operation, the count is automatically reduced. After a failure, the count is used to determine whether to attempt to perform the particular type of remedial action on the resource. Examples of remedial actions include restarting the resource, and relocating the resource to another node of a cluster. By using the count, the system insures that a faulty resource does not get constantly "bounced". By reducing the count when a resource has become stable, there is less likelihood that failure of otherwise stable resources will require manual intervention.

24 Claims, 2 Drawing Sheets

OTHER PUBLICATIONS

Microsoft, "Technical Overview of Clustering in Windows Server 2003," Microsoft Windows Server 2003 white paper, Mar. 2003, retrieved from the internet at <http://download.microsoft.com/download/4/d/e/4de815ref-2904-420a-b726-e57de31ae63a/ClusteringOverview.doc, pp. ii-v (table of contents) and pp. 6-23.

Veritas Software Corp. "Veritas Cluster Server: Powerful Protection Against Application and Server Downtime," Datasheet, Mar. 2003, retrieved from the internet at <http://eval.veritas.com/mktginfo/products/Datasheets/High_Availability/vcs_datasheet.pdf>, pp. 1-3.

Hewlitt Packard, "Cluster Application Availability," HP, Tru64 UNIX Manual, Version 5.1B, Sep. 2002, chapter 5, retrieved from the internet at <http://h30097.www3.hp.com/docs/base_doc/DOCUMENTATION/V51B_HTML/ARHGVETE/TITLE.HTM>, retrieved on Nov. 4, 2005, 8 pages.

Hewlitt Packard, "Tru64 UNIX: Section 4 Reference Pages, File Formats, caa(4)," HP, Tru64 UNIX Manual, Version 5.1B, Sep. 2002, retrieved from the internet at <http://h30097.www3.hp.com/docs/cluster_doc/cluster_51A/HTML/MAN/MAN4/0001__.HTM>, retrieved on Nov. 4, 2005, 10 pages.

* cited by examiner

HANDLING RESTART ATTEMPTS FOR HIGH AVAILABILITY MANAGED RESOURCES

FIELD OF THE INVENTION

The present invention relates to managed resources and, more specifically, to techniques for handling restart attempts of managed resources.

BACKGROUND

Resource/Application monitoring is a key feature of High Availability systems ("HA systems"). The ability of an HA system is judged by how little manual intervention is required to keep the resources/applications highly available. In this context, the term "resource" generally refers to any managed entity, such as a software application, network component, storage component etc.

When a resource goes down, the HA system should automatically restart the resource quickly without the need for the administrator/user to do anything. At the same time, when there is an inherent problem with the startup of a resource, the HA system should not try to start the resource forever in a loop (start, fail, start . . . ). When a resource is stuck in a loop of starting, failing, and restarting, the resource is said to be "bouncing". The longer a resource bounces, the more system resources are wasted.

To prevent continuous bouncing of a faulty resource, most HA systems limit the number of times a resource can be restarted. Specifically, after restarting for a certain number of times ("MAX_RESTARTS"), the resource is simply stopped. Thus, the MAX_RESTARTS value serves as a cap on the number of times a faulty resource will bounce.

Unfortunately, when MAX_RESTARTS is reached for a resource, there may not be an inherent problem with starting the resource. The restarts that caused MAX_RESTARTS to be reached for the resource may have occurred in the distant past, or may have occurred sporadically over a long period of time. Consequently, the fact that MAX_RESTARTS was reached on a resource may not reflect anything about the current stability of the resource. Thus, in many cases, even though MAX_RESTARTS has been reached, the resource may function well if the resource would just get restarted. However, because MAX_RESTARTS has been reached, the administrator is forced to start the resource manually.

Consider, for example, a system that uses a RESTART_COUNTER to keep track of how many times a resource is automatically restarted. With each automatic restart of the resource, the RESTART_COUNTER is incremented. If the resource fails once in a while over a long period of time, the RESTART_COUNTER for the resource may eventually reach MAX_RESTARTS for the resource. After the last restart, the resource may be stable for a long period of time. Even after a long period of stability, the resource would not be automatically restarted if the resource fails, since the RESTART_COUNTER has reached MAX_RESTARTS. Thus, the resource could not be restarted automatically and requires user intervention to get started.

To reduce the frequency of administrator intervention, the MAX_RESTARTS may be set to a large value. However, if MAX_RESTARTS is a large value, then the resource will "bounce" for a longer time for unrecoverable failures.

HA systems can be configured to implement various approaches to handling resource failures. An example of a first approach includes: when a resource fails and there are no more restarts, the resource is simply halted/stopped. If the resource is relocatable to another node, then relocation is attempted. If the resource is not relocatable, then the resource is just stopped, forcing the administrator to restart the resource manually.

Another example of an HA system is described in Server Clusters: Architecture Overview For Windows Server 2003 (published by Microsoft Corporation, March, 2003). The approach taken by this system generally includes: when a service/resource fails, a manual "Move" operation has to be done by the Cluster administrator. Specifically, if a resource fails, a Failover Manager might restart the resource, or take the resource offline along with its dependent resources. If it takes the resource offline, it will indicate that the ownership of the resource should be moved to another node and be restarted under ownership of the new node. Enhanced logic for node failover may be used in a cluster with three or more nodes. Enhanced failover includes doing a manual "Move Group" operation in Cluster Administrator.

Another example of an HA system is the VERITAS™Cluster Server from Symantec®. The approach taken by this system generally includes: when a resource fails, do not attempt to restart the resource at all. Instead, move the resource to another server for any kind of resource failure.

Another example of an HA system is the TruCluster Server Version 5.1B by Hewlett Packard®. The approach taken by this system generally includes: when a resource fails, restart the resource for only a specified number of times. After that, a relocation attempt is made. if the resource cannot be relocated, then the resource is just stopped.

Based on the foregoing, it is desirable to provide an HA system that handles the restart of resources more efficiently than the approaches employed by currently available HA systems.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are provided for avoiding manual intervention when possible, while still preventing the repeated bouncing of a resource for unrecoverable failures. According to one embodiment a MAX_RESTART limit is used in conjunction with a mechanism for (1) detecting conditions that indicate that a resource is stable ("stability conditions"), and (2) when stability conditions exist, automatically resetting the counter (RESTART_COUNTER) that is used to indicate the number of times resource has been restarted.

Using this technique, continuous bouncing of the resource is prevented by defining a finite number as MAX_RESTARTS. In addition, unnecessary manual intervention is avoided because the HA system automatically detects when a resource has reached a stable state, and resets the counter (RESTART_COUNTER) so that a stable resource will be restarted if the resource fails.

Detecting Stability Conditions

The stability of a resource can be determined in a variety of different ways. For example, a user can simply specify the amount of time a resource should be running for the resource to be considered stable (a "STABLE_TIME" value). The HA system may include a mechanism for tracking the running times of resources, and to reset the RESTART_COUNTER of a resource whenever the runtime of a resource reaches the STABLE_TIME associated with the resource.

Figure 1:
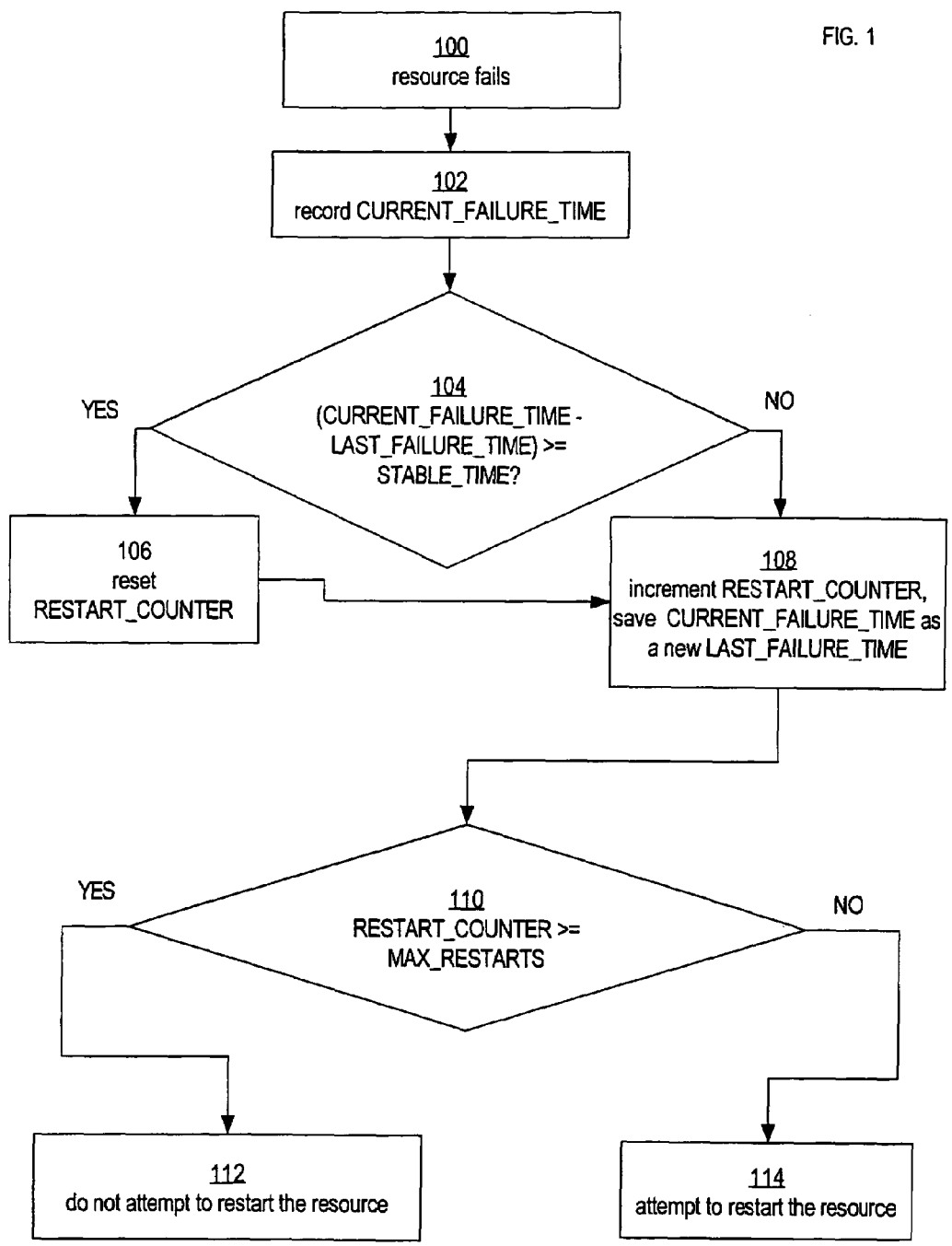
FIG. 1 is a flowchart illustrating steps for determining whether to restart a resource after a failure, according to an embodiment of the invention.

Proactively tracking the runtime of every resource involves a certain amount of overhead during steady-state operation. According to one embodiment, such overhead is minimized by using a mechanism that only checks the runtime of a resource in response to a failure of the resource. For example, the HA system may store a "LAST_FAILURE_TIME" for each resource. The LAST_FAILURE_TIME of a resource indicates the time of the last failure of the resource. FIG. 1 is a flowchart that illustrates how the LAST_FAILURE_TIME of a resource may be used to determine whether to reset the RESTART_COUNTER of a resource.

Referring to FIG. 1, at step 100 a resource fails. At step 102, the HA system records the time of the current failure (the CURRENT_FAILURE_TIME). At step 104, the HA system determines the runtime of the failed resource by determining the difference between the CURRENT_FAILURE_TIME and the LAST_FAILURE_TIME of the resource.

If the difference between the CURRENT_FAILURE_TIME and the LAST_FAILURE_TIME is greater than or equal to the STABLE_TIME of the resource, then control proceeds to step 106. Otherwise, control proceeds to step 108.

At step 106, the RESTART_COUNTER of the resource is reset, and control proceeds to step 108.

At step 108, the RESTART_COUNTER is incremented, and the current time is stored as a new LAST_FAILURE value. Control then proceeds to step 110.

At step 110, the HA system determines whether the RESTART_COUNTER has reached the MAX_RESTARTS value for the resource. If the RESTART_COUNTER has reached the MAX_RESTARTS value for the resource, then at step 112 the HA system does not attempt to restart the resource.

On the other hand, if the RESTART_COUNTER has not reached the MAX_RESTARTS value for the resource, then at step 114 the HA system attempts to restart the resource.

Comparing the time that a resource has been running to a STABLE_TIME is merely one example of how an HA system may determine that a resource has become stable. However, the means by which an HA system determines that a resource has become stable may vary from implementation to implementation. For example, in an alternative implementation, the HA system may periodically perform "stability tests" on resources. If a resource passes its stability test, then the system considers the resource to be stable, and resets or reduces the RESTART_COUNTER of the resource.

In yet another embodiment, a time-window based approach may be used. In the time-window based approach, the decision about whether to restart a resource is based on how many restarts have occurred within a time window of a specified duration. For example, assume that a five minute time window applies to a particular resource. If the MAX_RESTART value for the resource is 10, then the HA system will not restart the resource if the resource has been restarted 10 times within the last five minutes. The window approach may be implemented by: (1) incrementing the RESTART_COUNTER every time a resource is restarted, (2) storing the time of the restart operation, and (3) decrementing the RESTART_COUNTER when the recorded time of a restart operation becomes older than the current time minus the window duration. In the window-based-approach, the resource is considered stable if the number of restarts in a window is less than the MAX_RESTART value. However, instead of resetting the RESTART_COUNTER, the RESTART_COUNTER is only reduced by 1 whenever the time of a restart operation passes beyond the window.

In another embodiment, the amount by which the RESTART_COUNTER is reduced may be based on how long the resource has been running. The longer the resource runs, the greater the reduction.

Resource-Based Restart Rules

Different resources have different characteristics. For example, different resources may (1) consume different amounts of memory, (2) consume different amounts of computational power, (3) take different amount of time to start, (4) take different amounts of time to become operational, etc. According to one embodiment, the restart rules for a resource may be determined based on the characteristics of a resource. Thus, resources with different characteristics may have different restart rules.

According to one embodiment, users of the HA system are able to specify, on a resource-by-resource basis, the restart rules that apply to each resource. For example, a resource that takes a long time to become operational may merit a longer STABLE_TIME than a resource that takes a short time to become operational. Therefore, a user may specify, on a resource-by-resource basis, the STABLE_TIME that applies to each resource.

According to one embodiment, the HA system automatically establishes the restart rules for a resource based on the characteristics of the resource. For example, the HA system may be configured to automatically detect the relevant characteristics of each resource, and to select the restart rules accordingly. For example, the HA system may be configured to gather statistics about how long it takes for a resource to become operational, and then select a STABLE_TIME and/or MAX_RESTART value for the resource based on those statistics.

As another example, the HA system may maintain statistics about the historical time-between-restarts for each resource. Based on these statistics, the HA system may determine, on a resource-by-resource basis, the duration that constitutes "stable" operation. For example, a resource may be considered stable if the resource has been running at least as long as its average time-between-restarts.

Relocating Resources

Restarting a resource is merely one type of remedial action that an HA system may take in response to the failure of a resource. Another form of remedial action involves relocating the resource to another node in the cluster. If the instability of a resource was caused by problems associated with the node on which the resource was running, then relocating the resource may cause the resource to become stable.

Unfortunately, some resources may continue to be unstable regardless of the node on which they are running. Consequently, an approach that always relocates failed resources may cause a faulty resource to be repeatedly relocated within the cluster. To avoid an endless loop of relocation operations, a RELOCATE_COUNTER and MAX_RELOCATE value may be maintained for each resource. These values may be established and used in a manner similar to the RESTART_COUNTER and MAX_RESTARTS values described above. Specifically, the RELOCATE_COUNTER may be incremented each time a resource is relocated, and the HA system may stop relocating a resource when the RELOCATE_COUNTER for the resource reaches its MAX_RELOCATE value.

According to one embodiment, the RELOCATE_COUNTER of a resource is reduced when stability conditions are satisfied. The same techniques described above in the context of restarting a resource may be used to detect stability, and to reduce the RELOCATE_COUNTER when stability is detected. For example, the RELOCATE_COUNTER may be reset if the runtime of the resource exceeds a specified duration. As another example, the RELOCATE_COUNTER may be maintained to only reflect the number of relocations that occurred within a time window of a specified duration.

Hardware Overview

Figure 2:
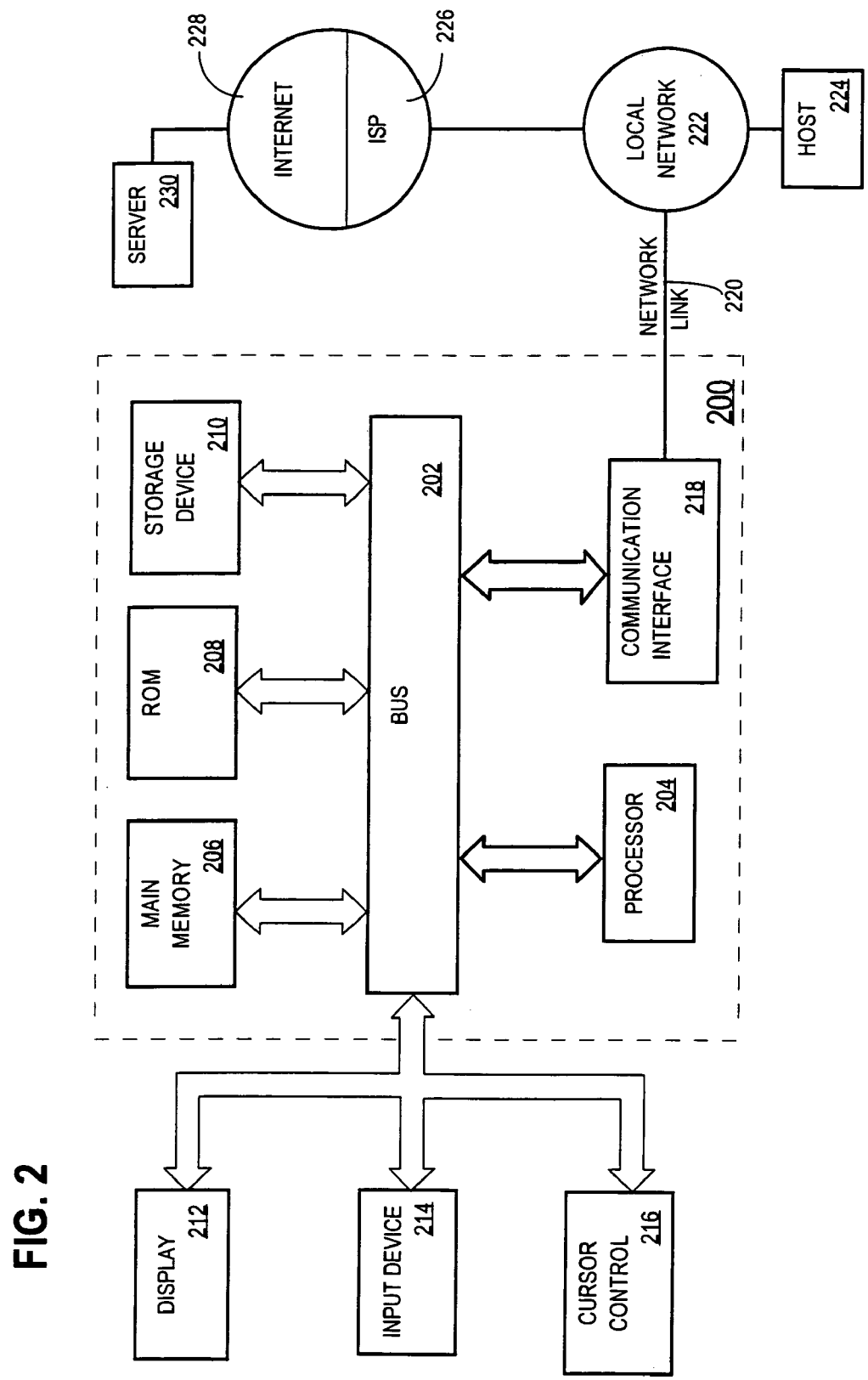
FIG. 2 is a block diagram illustrating a computer system upon which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of managing a resource, the method comprising:
   when a particular type of remedial action is performed on a resource, incrementing a count that reflects how often the particular type of remedial action has been performed for the resource;
   in response to determining that the resource has been in stable operation for at least as long as a stable-time established for the resource, automatically reducing the count, wherein determining that the resource has been in stable operation comprises storing a last-failure time;
   determining whether to attempt to perform the particular type of remedial action on the resource after a failure based on the count; and
   in response to determining that the count is less than a value, performing the particular type of remedial action on the resource.

2. The method of claim 1 wherein:
   the remedial action is restarting the resource;
   the step of incrementing a count when a particular type of remedial action is performed on a resource is performed by incrementing a restart count for the resource when the resource is automatically restarted;
   the step of automatically reducing the count is performed by automatically reducing the restart count; and
   the step of determining whether to attempt to perform the particular type of remedial action on the resource after a failure is performed by determining, based on the restart count, whether to attempt to restart the resource after a failure.

3. The method of claim 2 wherein the step of automatically reducing the restart count includes resetting the restart count.

4. The method of claim 2 wherein the step of automatically reducing the restart count includes reducing the restart count by an amount that is based on how long the resource has been running.

5. The method of claim 2 wherein the step of automatically reducing the restart count includes decrementing the restart count whenever a time associated with a previously-performed restart operation passes beyond a time window of a specified duration.

6. The method of claim 2 wherein:
   the step of determining whether to attempt to restart the resource is performed based on rules; and
   the rules are based, at least in part, on user-specified parameters.

7. The method of claim 2 wherein:
   the step of determining whether to attempt to restart the resource is performed based on rules; and
   the rules are based, at least in part, on automatically detected characteristics of the resource.

8. The method of claim 2 wherein:
   the method further includes establishing restart rules on a resource-by-resource basis; and
   the step of determining whether to attempt to restart the resource is performed based on the restart rules that apply to said particular resource.

9. The method of claim 1 wherein determining whether the resource had been operating for at least as long as the stable-time established for the resource is performed in response to a failure of the resource.

10. The method of claim 9 wherein
    determining whether the resource has been operating for at least as
    long as the stable-time includes:
    determining a current-failure-time of the resource; and
    comparing the current-failure-time against the last-failure-time of the resource.

11. The method of claim 10 further comprising, after determining whether the resource had been operating for at least as long as the stable-time, storing the current-failure-time as a new last-failure-time for the resource.

12. The method of claim 1 wherein:
    the remedial action is relocating the resource;
    the step of incrementing a count when a particular type of remedial action is performed on a resource is performed by incrementing a relocate count for the resource when the resource is automatically relocated;
    the step of automatically reducing the count is performed by automatically reducing the relocate count; and
    the step of determining whether to attempt to perform the particular type of remedial action on the resource after a failure is performed by determining, based on the relocate count, whether to attempt to relocate the resource after a failure.

13. A machine-readable storage medium storing one or more sequences of instructions which, when executed by one or more processors, causes the one or more processors to perform the method recited in claim 1.

14. A machine-readable storage medium storing one or more sequences of instructions which, when executed by one or more processors, causes the one or more processors to perform the method recited in claim 2.

15. A machine-readable storage medium storing one or more sequences of instructions which, when executed by one or more processors, causes the one or more processors to perform the method recited in claim 9.

16. A machine-readable storage medium storing one or more sequences of instructions which, when executed by one or more processors, causes the one or more processors to perform the method recited in claim 10.

17. A machine-readable storage medium storing one or more sequences of instructions which, when executed by one or more processors, causes the one or more processors to perform the method recited in claim 11.

18. A machine-readable storage medium storing one or more sequences of instructions which, when executed by one or more processors, causes the one or more processors to perform the method recited in claim 3.

19. A machine-readable storage medium storing one or more sequences of instructions which, when executed by one or more processors, causes the one or more processors to perform the method recited in claim 4.

20. A machine-readable storage medium storing one or more sequences of instructions which, when executed by one or more processors, causes the one or more processors to perform the method recited in claim 5.

21. A machine-readable storage medium storing one or more sequences of instructions which, when executed by one or more processors, causes the one or more processors to perform the method recited in claim 6.

22. A machine-readable storage medium storing one or more sequences of instructions which, when executed by one or more processors, causes the one or more processors to perform the method recited in claim 7.

23. A machine-readable storage medium storing one or more sequences of instructions which, when executed by one or more processors, causes the one or more processors to perform the method recited in claim 8.

24. A machine-readable storage medium storing one or more sequences of instructions which, when executed by one or more processors, causes the one or more processors to perform the method recited in claim 12.

\* \* \* \* \*

UNITED STATES PATENT AND TRADEMARK OFFICE
CERTIFICATE OF CORRECTION

PATENT NO. : 7,496,789 B2
APPLICATION NO. : 11/146531
DATED : February 24, 2009
INVENTOR(S) : Dasari et al.

It is certified that error appears in the above-identified patent and that said Letters Patent is hereby corrected as shown below:

In column 2, line 28, delete "made. if" and insert -- made. If --, therefor.

Signed and Sealed this

Eighteenth Day of May, 2010

David J. Kappos
*Director of the United States Patent and Trademark Office*